(No Model.)

2 Sheets—Sheet 1.

F. LAMBERT.
METER.

No. 588,646.

Patented Aug. 24, 1897.

Witnesses:
O. N. Rayport
Thomas Littlejohn

Inventor:
Frank Lambert
By Edwin H. Brown
His Attorney (No Model.) 2 Sheets—Sheet 2.

F. LAMBERT.
METER.

No. 588,646. Patented Aug. 24, 1897.

WITNESSES:
D. N. Hayward
Thomas Littlejohn

INVENTOR
Frank Lambert
BY Edwin H. Brown
HIS ATTORNEY.

UNITED STATES PATENT OFFICE.

FRANK LAMBERT, OF BROOKLYN, NEW YORK, ASSIGNOR OF ONE-HALF TO JOSEPH W. KAY, OF SAME PLACE.

METER.

SPECIFICATION forming part of Letters Patent No. 588,646, dated August 24, 1897.

Application filed December 3, 1894. Serial No. 530,639. (No model.)

*To all whom it may concern:*

Be it known that I, FRANK LAMBERT, of Brooklyn, in the county of Kings and State of New York, have invented certain new and useful Improvements in Meters, of which the following is a specification.

My improvement relates to fluid-meters, and is particularly directed toward that class of meters known as "nutating" or "oscillating" disk meters.

The special portions of the meter improvements in which are embodied in the present invention are the disk proper or piston, its ball and ball-bearing, and the disk-angle-controlling action. New means have also been provided to lessen the wear and friction due to the sliding of the disk over the partition or diaphragm which divides the disk-chamber.

The invention further embodies improvements in other details of construction tending to improve this type of meter and to cheapen its manufacture.

I will describe a meter embodying my improvement and then point out the novel features in the claims.

Figure 1:
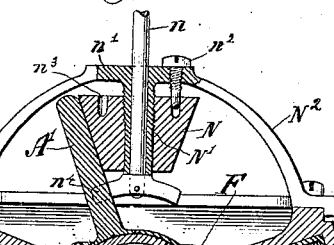
Figure 12:
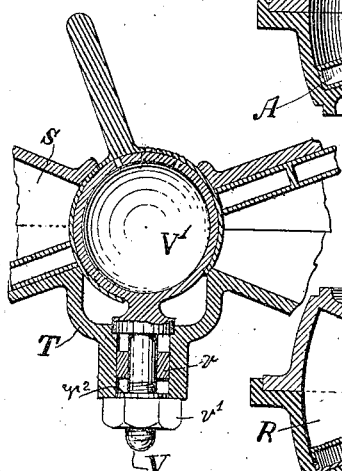
Figure 3:
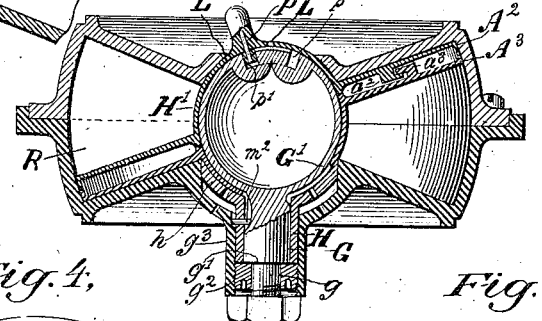
Figure 2:
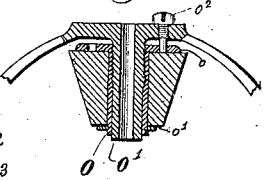
Figure 4:
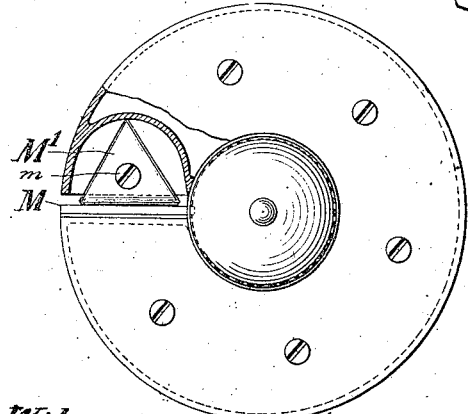
Figure 5:
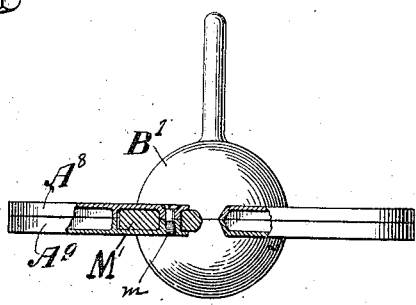
Figure 6:
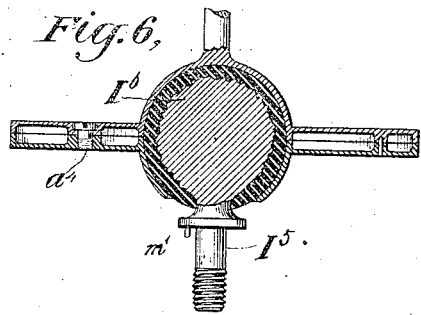
Figure 7:
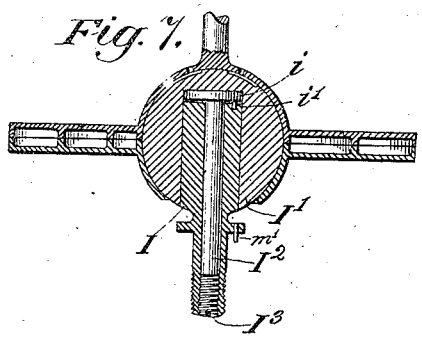
Figure 8:
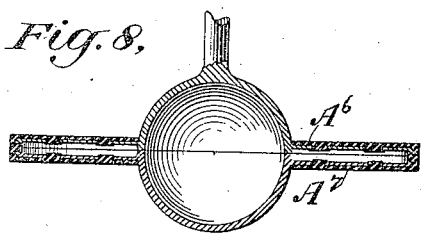
Figure 9:
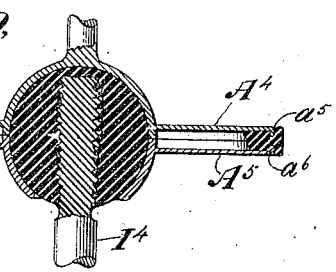
Figure 10:
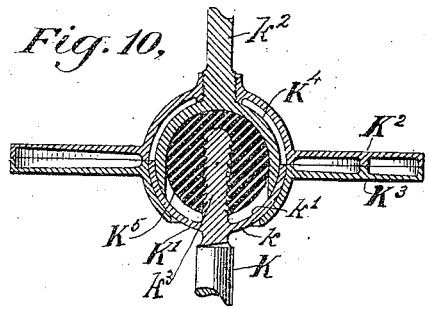
Figure 11:
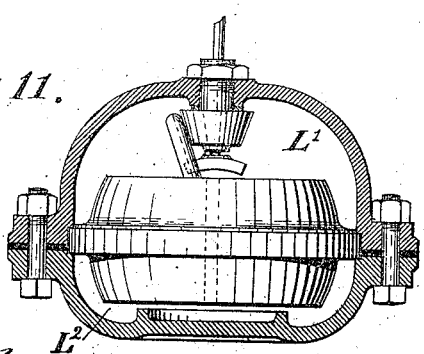

In the accompanying drawings, Figure 1 is a central vertical section through a meter embodying my improvement, certain parts to which my improvement does not appertain being omitted. Fig. 2 shows a modified form of construction particularly adapted to determine and control the angle of the disk. Fig. 3 is a vertical section similar to that shown in Fig. 1, but of a modified form of meter. Fig. 4 is a plan view of a disk or piston embodied in the meter, part, however, being broken away to show a construction designed to reduce the wear and friction due to the sliding of the disk over the partition or diaphragm. Fig. 5 is an edge view of Fig. 4, part, however, being shown in section. Fig. 6 is a central vertical section through a disk, its bearings, and its supporting-ball and stud. Fig. 7 is a section similar to that shown in Fig. 6, but of a modified form and construction. Fig. 8 is a vertical section of a modified form of disk. Figs. 9 and 10 are central vertical sections through modified forms of disks, their bearings, and supporting-balls and studs. Fig. 11 is a central vertical section of a meter, partly in elevation, showing a pressure chamber or chambers. Fig. 12 is a central vertical section of a modified form of disk-chamber.

Similar letters of reference designate corresponding parts in all figures.

The process I preferably use in the construction of the disk forming the piston for my improved meter is by direct molding and casting, as described, for instance, in Patent No. 512,845, granted to Eugene C. Smith January 16, 1894. This process is particularly adapted to the forming of disks having very thin faces directly by casting and which require little or no polishing, truing, finishing, or machine-work of any kind to be done after the same come from the mold, except at the peripheral portion, which I prefer to grind or turn to fit the disk-chamber.

To prevent the binding of the disk in its chamber in case of a slight flexion of the former, its outside diameter may be ground or finished to a curve having a radius slightly less than that of the chamber. I have found that a radius about one-tenth less than the true radius of the chamber gives a disk sufficiently small to prevent its binding in its chamber, but not sufficient to form a leak between the chamber-wall and the outside of the disk, but, of course, I do not limit myself to this particular relation of the radii.

The disk A, Fig. 1, may be cast hollow, formed in one piece with a spindle A', and provided with internal strengthening-ribs $a\ a'$. A metal ball B may be first cast or turned and then inserted in the mold with the flat core for the interior of the disk. The disk can then be cast around the ball and the ball will be free and nicely fitted directly by casting with little, if any, further machining operation. The disk may, however, be cast in two parts, as shown in Fig. 3. In such a case the two parts $A^2\ A^3$ of the disk may be provided with undercut lugs $a^2\ a^3$, so that by placing the two parts $A^2\ A^3$ together a few degrees from their relative positions and then turning them slightly in opposite directions the overhanging edges of the lugs $a^2\ a^3$ will slide under each other and the two parts $A^2\ A^3$ become as firmly locked and rigid as if the disk were made in a single piece. A small pin or screw $a^4$ (see Fig. 6) may then be inserted to prevent the relative movement and unlocking of the two parts of the disk. I do not wish to limit myself to the use of a screw to prevent the unlocking of the parts $A^2 A^3$, as other methods of securing the two parts together may be employed—as, for instance, soldering or riveting.

For a meter intended to measure large deliveries and where the disk is of large diameter I prefer to cast it hollow with the faces thick near the center and tapering toward the outside edge, (see Fig. 10,) so as to reduce the weight at those portions of the disk where the motion is the greatest, thereby reducing the momentum and the weight of the disk without reducing its strength. The disk may also be constructed for carrying packing material at its periphery to contact with the inner peripheral surface of the chamber within which it rocks. Such a construction is represented in Fig. 9 and here consists of a ring of packing material C, clamped between the inwardly-extending edges $a^5 a^6$ of the two parts $A^4 A^5$ of the disk. The width of the packing may be the same as the width of the disk or it may extend slightly beyond the upper and lower faces of the same, in which case the metallic noise due to the contact of the faces of the disk with the conical-shaped surfaces of the chamber will be prevented. The packing may, if desired, be extended over and cover the upper and lower surfaces of the disk, besides forming a packing on its peripheral edge, as shown in Fig. 8. The two portions $A^6 A^7$ of the disk may with advantage be perforated to interlock with the packing. A good joint will thus be formed between the upper and lower surfaces of the disk, its edge or peripheral portion, and the surfaces of the chamber with which they come in contact.

I will now refer more particularly to the details of construction of the ball and ball-bearings embodied in the improvement.

As shown in Fig. 5, if the disk $A^8 A^9$ is intended to be used without any internal ball-bearing it can be cast flat and hollow, while the central ball B' can be made of a separate piece and mounted upon the disk. A plain rubber ball or a rubber ball with a skeleton of metal, so as to restrict and limit the expansion and contraction of the rubber ball, can be used and will be preferable in measuring hot water.

In Fig. 1 the disk A is enlarged at its middle portion, and this enlargement $A^{10}$ is provided with a spherical cavity forming the bearing for the spherical end or ball B of a stud E, projecting upwardly through the lower portion of the meter. This stud E may be supported and means for its adjustment provided by giving it a reduced lower extremity or stem e, forming a shoulder e'. The main portion of the stud E fits, piston-like, in the opening of a tubular projection $e^2$, extending downward from the meter. The lower interior portion of this tubular projection $e^2$ is screw-threaded to engage with the thread upon a stop-piece $e^3$, through a central aperture of which latter extends the stem e of the stud E. The lower portion of this stem is threaded and receives a nut $e^4$, which contacts with the lower end of the tubular portion $e^2$. The shoulder e' rests upon the stop-piece $e^3$ and the stud E, and consequently the ball B may be adjusted longitudinally backward or forward by screwing this stop-piece in or out. When adjusted, the shoulder e' may be forced firmly down upon the stop-piece $e^3$ and the stud E held firmly in position by the nut $e^4$.

The recesses F F', formed in the apex portions of the upper conical surface E' and the lower conical surface $E^2$ of the disk-chamber, are suitably constructed at their edges to make a close fit with the outer spherical surface of the lower walls of the enlarged portion $A^{10}$ of the disk. These walls are carried downward below the lower surface of the disk A, but do not meet at their lower portion, there being provided at this point an opening for the stud E to pass through and which is sufficiently large to permit the free rocking motion of the disk.

In Fig. 3 the stud G is provided with an enlarged spherical extremity G', a reduced lower extremity or stem g, a shoulder g', and a threaded stop-piece $g^2$, engaging with the threaded interior of a tubular projection $g^3$, extending downward from the meter. There is also provided a lower sleeve H, fitted to the bore of the opening through the tubular projection $g^3$, within which sleeve stud G is fitted.

The sleeve H may abut against the adjustable stop-piece $g^2$, and it is provided with a cup-shaped upper portion h, forming a bearing for the outer surface of the spherical wall of the enlarged portion H' of the disk. As a result of this construction, should there be any wear in the fit of the ball-joint, by turning the stop-piece $g^2$ the bearing formed by the cup-shaped portion of the sleeve H, as well as the enlarged spherical extremity or ball G' of the stud G, will be adjusted at the same time—that is, both the stud G and the sleeve H will be raised the same amount and a good fit always maintained between the ball G' and the spherical cavity in the enlarged portion H' of the disk, at the same time keeping the ball central with the axis of the disk-chamber. The sleeve H may also be threaded to engage with the similarly-formed bore of the tubular projection $g^3$, whereby an independent adjustment of the lower bearing h may be secured. The apex portion of the bottom surface of the disk-chamber is suitably formed to receive the bearing h, carried by the sleeve H. By this construction the close fitting of the lower surface of the disk-chamber to form a bearing for the lower walls of the spherical enlargement H' of the disk is avoided, and the machine operations may be done on small pieces easy to handle, while at the same time the construction offers good and reliable means of adjustment.

The spherical portion G' of the stud G instead of remaining stationary may itself rotate. Such a construction is especially desirable when the flow of water or other fluids is swift and has a tendency by striking the edge of the disk where it enters the disk-chamber to push the disk against its ball, thus producing excessive wear in this direction. If, however, the ball is revolving upon its stud, the position of the ball will change and equalize the wear. Such a construction is shown in Fig. 7.

I is the stud which is intended to extend upwardly into the disk-chamber.

I' is a ball forming a support for the disk and rotatably mounted upon the stud I.

I² is a central rod extending through the stud I and abutting against the ball I' at its upper extremity through an interposed collar $i$, secured to the rod I². A screw I³ closes the opening through the stud at the lower extremity of the same and forces the rod I² upward. It serves for the vertical adjustment of the ball I'. The collar $i$ will preferably have a downwardly-extending pin $i'$ entering a recess formed in the stud I to prevent its rotation.

Instead of forming the ball of metal it may be constructed from hard, semihard, or soft rubber or similar material or combination of the same, depending upon the size of the meter, the fluid to be measured, &c. Such a construction is more particularly shown in Figs. 6 and 9 and consists in supplying the studs I⁵ I⁴ with some material formed to a spherical shape and which constitutes a supporting-ball entering the spherical cavity provided in the disk. If a plastic material is utilized in forming the ball, the surface of the stud may advantageously be roughened, the better to enable the material to hold thereto. I do not wish to limit myself to a ball of this particular construction, as the interior surface of the spherical cavity may itself be lined with the material. A wooden ball I⁶, covered with rubber, as shown in Fig. 6, will form a good combination for hot water, as wood has practically no heat expansion.

Fig. 10 represents a compound internal bearing which can be used as shown in the drawings or in connection with the bearing and sleeve H shown in Fig. 3. As shown in Fig. 10, the stud K carries a hollow spherical segment K', whose outer surface $k$ and inner surface $k'$ form bearings. The outer surface $k$ forms a bearing for the inner surface of the lower side walls of the spherical cavity in the disk K² K³, while its inner surface $k'$ forms a bearing for the outer surface of a second hollow spherical segment K⁴, carried by the rod $k^2$, attached to the disk and projecting downward into the spherical cavity of the same. The inner surface of the segment K⁴ is itself in contact with a ball K⁵, secured to a pin $k^3$, projecting upward from the bottom of the spherical segment K'. In this construction all the bearings and the ball can be turned independently either of the disk or disk-chamber, and while I have in this construction apparently only half ball-bearings the figure shows that I have in fact a full ball-bearing formed by several half-bearings acting in opposite directions, which will be very effective if means of adjustment as above described are used.

By reference to Fig. 3 it will be noticed that at the top the ball G' is cut away and not in contact with the bearing of the disk. The external surface of the walls of the spherical cavity of the disk may have also sufficient bearing only at the bottom to make a joint with the edges of the recess F', provided in the apex portion of the lower conical surface, as shown in Fig. 1. By so constructing these parts and providing holes L, communicating with a pressure-chamber L' L², (see Figs. 1 and 3,) the fluid is admitted between the bearing and the surface of the ball, the pressure between the two surfaces being to a greater or less extent thereby balanced, and as a result easing the motion and preventing undue wear.

The pressure-chamber L' L² (see Fig. 11) may advantageously be formed by two caps surrounding and inclosing the outer casing of the disk-chamber. The upper portion L' of the disk-chamber L' L² and the lower portion L² may be connected together, and they may then be connected either with the inlet or with the outlet passage of the meter. They may, however, form independent chambers, in which case one may be connected with the inlet and the other with the outlet passage.

The slot of the disk A⁸ A⁹, (see Figs. 4 and 5,) through which the diaphragm M extends, is cut wide enough to permit the insertion of an adjustable shoe M', and the disk is provided with a suitable recess to hold the same. The shoe is free to oscillate around the center pin $m$ and adjust itself to its true position of contact when the disk is pressed toward the diaphragm M. The wear on the shoe M' and diaphragm M is equalized, while to quite an extent this pivotal connection will facilitate the sliding motion of the disk on the diaphragm and prevent it from cramping. This shoe M' can be made reversible on the center pin $m$, so as to offer two or more wearing-surfaces. This shoe may be made of rubber, hard, semihard, or soft, and to prevent its distortion and expansion there may be inserted in the rubber a small piece of metal, preferably perforated, so that the rubber by going through the perforations will adhere to the metal at the time of vulcanization. Wood may also be used. Instead of putting the shoe upon the disk it may be placed upon the diaphragm.

I do not wish to limit myself to a diaphragm made in one piece or one rigidly secured to the meter, as the diaphragm or partition may be made independent of the disk-chamber or the different portions of the casing of the disk-chamber may carry a part of the diaphragm, so that when the portions of the casing are put together a complete diaphragm will be formed. This construction will facilitate the introduction of the piston or disk into its chamber.

In order to insure a perfect alinement of the ball-bearing with the chamber when the meter is taken apart for repairing, cleaning, or other purposes and put together again, I may provide the stud carrying the ball with a pin $m'$, which when in register with a suitable recess in the chamber-casing insures the correct alinement of the parts; or where the parts are adjustable, as in Fig. 3, a pin $m^2$ may be secured to one of the parts—the sleeve H, for instance—and extended into slots formed in the chamber-casing and the stud G. I do not wish to limit myself to these particular registering devices, however, as others—for example, a set-screw—may be used.

In Fig. 1 the disk is provided with a spindle $A'$, central with respect to the spherical enlargement $A^{10}$ of the disk and preferably extending at right angles to the plane of the disk. It can be cast integral with the disk or independently of it and subsequently attached to it. N is a hub in shape resembling a frustum of a cone. The hub N may with advantage be carried by a threaded sleeve $N'$, within which revolves the shaft $n$. The sleeve is provided at its upper extremity with a flange $n'$, which may be secured to a frame $N^2$, attached to the casing of the disk-chamber or meter.

Instead of being attached to the frame $N^2$ the hub N may be attached directly to the upper portion of the casing. The hub N is adjustable longitudinally along the sleeve $N'$ by means of engaging threads, and when so adjusted it may be secured by a screw $n^2$, passing downward through the flange $n'$ and entering one of a number of recesses $n^3$ provided in the upper surface of the hub.

The shaft $n$ is provided with an outwardly-extending finger $n^4$ at its lower end, which crosses the path of movement of the spindle $A'$ and by means of which the registering mechanism of the meter is actuated.

The hub N may be made of metal or hard rubber, but in order to obtain a little yielding of the disk in the case of foreign matter entering the meter I preferably employ a hub made of semihard or soft rubber, which can be molded upon a skeleton of metal. Instead of having the hub rigid it may be fitted to revolve upon its axis. In this case the hub may be fitted to revolve upon a tubular stationary shaft O between two shoulders $o\ o'$, with which the latter is provided, the inner threaded bore of the shaft O engaging with the similarly-threaded exterior of a hollow sleeve $O'$, attached to the meter or some appurtenance thereof. This construction is clearly shown in Fig. 2. The flange $o$ of the tubular shaft O may engage with a screw $O^2$, similar to the screw shown in Fig. 1, to lock the same in an adjusted position.

While I have described a controlling angle action of the disk by means of a spindle and fixed bearing or hub, the controlling-action may be inside the spherical cavity of the disk.

In Fig. 3 P is a projecting pin extending into the spherical cavity of the disk from the upper surface of the spherical enlargement $H'$ of the same and entering a circular groove $p$, formed in the upper surface of the ball G; or the construction may be reversed, the pin extending from the ball and entering a recess formed in the inner surface of the spherical cavity, without departing from the spirit of the invention. The pin P may advantageously be supplied with a friction-roller $p'$ to work in the groove.

The internal ball for supporting the disk I prefer to make hollow in order to save metal. The pressure between the ball and the ball-bearing may then be balanced by admitting the fluid to the interior of the ball. This may be done, as shown in Fig. 1, by drilling a hole R through the stud E, which opens out into the interior of the ball, and also providing outflow-holes $r\ r'$ at the top and bottom portions of the ball, opening out through these portions of the ball which have been cut away. The hole R through the stud communicates with the pressure-chamber $L'\ L^2$. Thereby pressure will be transmitted from the interior of the ball outward against the bearings formed in the spherical cavity in the disk. Holes L may then be done away with.

In Fig. 3 the diaphragm R is represented as being in one piece. To facilitate the introduction of the piston and its supporting-ball, the construction shown in Fig. 12 may be adopted. In this figure the diaphragm S is in one piece. T is the bottom portion of the disk-chamber, having an enlarged central opening for the reception of the stud V, carrying the supporting-ball $V'$. The stud V is provided with an upper shoulder, which is seated in a suitable recess encircling the lower opening in the disk-chamber. The diameter of the lower opening is larger than that of the main portion of the stud, and the latter can consequently be tipped to one side during its insertion in order that the ball $V'$ may avoid the diaphragm S. When fully seated on its shoulder, the stud V may be held central by a loose sleeve $v$, and then secured in position by the nut $v'$. The latter may, however, be provided with a collar $v^2$ to center the stud, in which case the sleeve $v$ may or may not be used.

In case the diaphragm is made of an independent piece and then inserted in the disk-chamber its placing and securing may be facilitated by slotting the disk-chamber axially and then introducing the diaphragm into this opening. This slot is represented in dotted outline in Fig. 11.

Having described my invention, what I consider as new, and desire to secure by Letters Patent, is—

1. In a water-meter, the combination of a piston-chamber and a hollow nutating piston, said piston being made in parts removably secured together, with means to register these parts in a true, central relative position, substantially as specified.

2. In a meter, the combination with a piston-chamber and a registering mechanism of a supporting-ball, and a stud or pin for carrying the ball, the supporting-ball being independent of the stud or pin, substantially as specified.

3. In a meter, the combination with a piston-chamber, a diaphragm and a supporting-ball of a nutating piston having an internal ball-bearing a stud or pin for carrying the supporting-ball, the ball being mounted to freely turn upon the pin or stud and means for adjusting the ball, substantially as specified.

4. In a water-meter the combination of a piston-chamber, a diaphragm, a supporting-ball, a nutating piston having an internal ball-bearing, a stud or pin for carrying the supporting-ball, and which is removably secured in its bearing, and means for registering the pin in its true relative position and preventing its rotation, substantially as specified.

5. In a water-meter, the combination with a piston-chamber, of a nutating piston having an internal ball-bearing, and a supporting-ball, said piston and supporting-ball being hollow, substantially as specified.

6. In a water-meter, the combination with a piston-chamber of a piston having a motion of nutation and an internal ball-bearing and a supporting-ball which is hollow, substantially as specified.

7. In a meter, the combination with a nutating piston made in a number of parts and having internal lugs or ribs for locking the parts together, of a central spindle and an external ball for the piston, substantially as specified.

8. In a water-meter, the combination of a piston-chamber, a diaphragm, a nutating piston and an independent shoe carried by the piston, the shoe being free to swing in a plane parallel to the plane of the piston, substantially as specified.

9. In a water-meter, the combination of a piston-chamber a diaphragm, a nutating piston and an independent shoe carried by the piston, the shoe being self-adjustable about an axis perpendicular to the plane of the piston, substantially as specified.

10. In a meter, the combination with a piston-chamber, a supporting-ball, and a nutating piston having an internal ball-bearing, of a pressure-chamber provided with passage-ways leading to the ball and ball-bearing, for relieving the pressure upon said ball and ball-bearing, substantially as specified.

11. In a meter the combination with a diaphragm and registering mechanism of a nutating piston having an internal ball-bearing, an independent hemispherical or cup-shaped piece forming a bearing supplementing that of the piston proper, a stud, a supporting-ball carried by the stud and a second hemispherical or cup-shaped piece, carried by the piston and forming a bearing or bearings, substantially as specified.

12. In a water-meter, the combination with a piston-chamber and a nutating piston having an internal bearing, of a supporting-ball, a stud or pin upon which the supporting-ball is carried and a piece having an external spherical bearing and a hollow stem fitting internally the stud or pin carrying the supporting-ball, the piece fitting externally a recess central to the axis of the stud or pin, substantially as specified.

13. In a meter, the combination with a nutating piston, having a central spindle of a central hub for controlling the movement of the spindle, and means for adjusting the hub and locking the same when adjusted, substantially as specified.

14. In a water-meter, the combination with a nutating piston having an internal ball-bearing, of a supporting-ball and an angle-controlling device formed between the supporting-ball and the internal bearing-surface of the piston, substantially as specified.

15. In a meter, the combination with a piston-chamber, of a nutating piston made hollow, having lugs or ribs, the thickness of the metal forming the faces of the piston tapering from the center to the outer edge of the piston, substantially as specified.

16. In a meter, the combination of a nutating piston having an internal ball-bearing, a supporting-ball, a stud for carrying the ball loosely fitted in a central hole in the lower surface of the piston-chamber and means for locking the same in a central position with respect to the chamber, substantially as specified.

17. In a meter, the combination with a piston-chamber, of a nutating piston having an internal bearing, a supporting-ball, means for adjusting the supporting-ball, and a locking device for keeping the ball in position, the adjusting and locking means and device being independent of each other, substantially as specified.

18. In a meter, the combination with a piston-chamber, and a nutating piston having an internal ball-bearing, of a supporting-ball, the bearing-surface between the piston and the supporting-ball being cut away in one or more places with which the fluid of the chamber communicates, substantially as specified.

In testimony whereof I have signed my name to this specification in the presence of two subscribing witnesses.

FRANK LAMBERT.

Witnesses:
W. LAIRD GOLDSBOROUGH,
JOS. W. KAY.